Patented Dec. 28, 1943

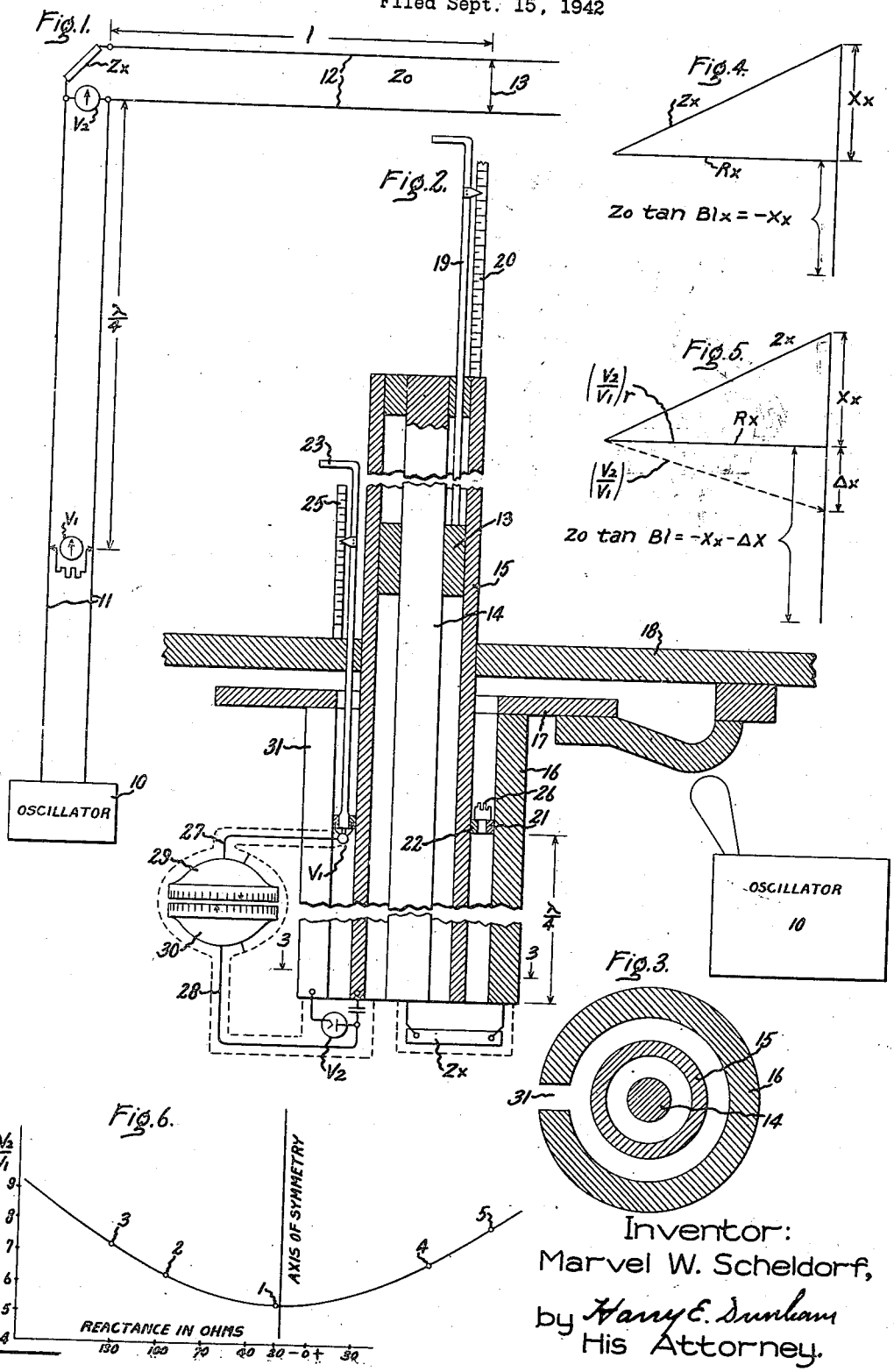

2,337,934

UNITED STATES PATENT OFFICE 2,337,934

ULTRA HIGH FREQUENCY IMPEDANCE MEASURING APPARATUS

Marvel W. Scheldorf, Schenectady, N. Y., assignor to General Electric Company, a corporation of New York Application September 15, 1942, Serial No. 458,377

5 Claims. (Cl. 175—183)

My invention relates to a method and apparatus by means of which measurements can be made for the accurate determination of the values of unknown impedances in ultra high frequency circuits, both as regards the resistance and plus or minus reactance component values thereof.

Considering the difficulties generally involved in making measurements and calculations pertaining to high frequency circuits, the apparatus used and the calculations necessary for the determination of the unknown circuit constants according to my invention are relatively simple.

According to my invention I make use of transmission lines, one being a supply line and the other of which is adjustable and includes the unknown impedance in series. The measurements used are the length of the variable line and the relation between two voltages, one being the voltage across the adjustable transmission line and unknown impedance connected in series and the other voltage being that across the supply line taken one-quarter wave length from the first voltage measurement point.

The features of my invention which are believed to be novel and patentable will be pointed out in the claims appended hereto. For a better understanding of my invention reference is made in the following description to the accompanying drawing in which Fig. 1 represents an explanatory diagram of the transmission line apparatus and connections employed in my invention. Fig. 2 shows a sectional view of a concentric cable transmission line arrangement of my invention which is the more practicable and preferred form. Fig. 3 represents a cross-section of the concentric cable arrangement of Fig. 2 taken on line 3—3. Fig. 4 represents an explanatory vector diagram for a resonant condition of adjustment of the variable impedance transmission line section. Fig. 5 is the corresponding diagram for a non-resonant adjustment and Fig. 6 is a resonance curve which is useful in obtaining accurate measurement values.

Referring now to Fig. 1, 10 represents an ultra high frequency oscillator for generating the ultra high frequency source of supply employed for the measurement circuit. For example, if it is desirable to measure the impedance of an unknown impedance device at 300 megacycles, then a 300 megacycle source of supply is used. The oscillator is coupled to the local end of and feeds a transmission line section 11 which extends to a voltmeter V2 at the remote end. Between voltmeter V2 and the source 10 a second voltmeter V1 is connected across line section 11. V2 and V1 will also be used hereinafter to designate the voltages measured by the corresponding voltmeters. Voltmeter V1 is placed one-quarter wave length away from voltmeter V2 towards the source 10. This can be done by adjusting position of V1 until $$\frac{V2}{V1}$$

is a maximum. This creates the very desirable situation that for a given constant value of V1 the voltage V2 is directly proportional to any impedance connected in parallel with V2. This follows from a familiar transmission line relationship, namely that for two points one-quarter wave length apart, the current at one point is directly proportional to the voltage at the other point.

Extending beyond voltmeter V2 is a second transmission line section 12 which has an adjustable length $l$. That is, a short circuiting connector 13 is provided which is adjustable along line 12 so that the effective length $l$ from voltmeter V2 to the terminal short circuit 13 may be varied. The unknown impedance $Zx$ which is to be measured is connected in series with line 12 between voltmeter V2 and the beginning of line section 12, as indicated. Because of ultra high frequency transmission line properties the position of short circuit 13 may be adjusted so that the line can be made to have a terminal impedance which has, for practical purposes, no resistance and either inductive or capacitance reactance of any value from zero to infinity. Hence with the series circuit combination of $Zx$ and 12 in parallel with V2, it is possible by adjusting 13 along line 12 to balance out the reactance component in the unknown impedance $Zx$. This condition will be indicated when the voltage relation $$\frac{V2}{V1}$$

is a minimum which corresponds to the lowest impedance across V2. When such adjustment is reached, the reactance of the line section 12 will be equal in magnitude and opposite in sign to the reactance component $Xx$ of $Zx$. The reactance of line 12 corresponding to a given value of $l$, can be readily determined mathematically from its geometry. It is equal to $Zo \tan Bl$, where $Zo$ is the unit impedance determined from the effective spacing of the conductors of line 12, $l$ its length which is measured and B the electrical angle of the line determined by the frequency used or is the length of line 12 in electrical degrees per unit of length $l$. $Zo \tan Bl$ is thus known or readily determinable. Having found the reactance component of $Zx$, the resistance component can also be determined by another adjustment of line 12. The relations may be pictured vectorially in Figs. 4 and 5.

In Fig. 4 the vector $Zx$ representing the unknown impedance, is the hypotenuse of a right angle triangle, the other two sides of which comprise the resistance component $Rx$ of the unknown and the reactance component $Xx$ of the unknown (shown positive for example, to represent an inductance). Thus, $Zx = Rx + jXx$, where $j$ indicates the right angle vector relation of $Rx$ and $Xx$.

From the principle that the ratio of $$\frac{V2}{V1}$$

is proportional to the impedance connected in parallel with V2, it follows that the voltage relation $$\frac{V2}{V1}$$

is proportional to the magnitude of $$Rx + j(Xx + Zo \tan Bl)$$

When we adjusted $l$ to make $$\frac{V2}{V1}$$

a minimum we adjusted line 11 to a condition of resonance where $Zo \tan Blr = -Xx$. In this equation $lr$ has been used to indicate the length of line 12 for the resonant condition. The value $Zo \tan Blr$ is pictured in Fig. 4 by the length of the vertical line below vector $Rx$. That is, it is equal to $Xx$ but is negative and thus indicates a capacitive reactance.

To find $Rx$ we now proceed as follows: $l$ is changed to produce a non-resonant condition which, of course, increases the voltage relation $$\frac{V2}{V1}$$

The minimum value $$\frac{V2}{V1}$$

at resonance will be designated $$\left(\frac{V2}{V1}\right)_r$$

and the increased ratio $$\left(\frac{V2}{V1}\right)$$

In the condition represented in Fig. 4 the apparent impedance connected in parallel with voltmeter V2 is $Rx$ because the reactance components $Xx$ and $Zo \tan Blr$ have been balanced out. Hence the minimum voltage ratio $$\left(\frac{V2}{V1}\right)_r$$

is proportional to $Rx$. When $l$ is changed to produce a non-resonant condition, $$\left(\frac{V2}{V1}\right)$$

is increased and its relation to $$\left(\frac{V2}{V1}\right)_r$$

may be represented in Fig. 5 by the dotted line.

$Xx$ is no longer balanced because the reactive impedance of line 12 has been increased to a non-resonant condition value $$Zo \tan Bl = Zo \tan Blr + \Delta X = -Xx + \Delta X$$

$Xx$ was determined and hence is known. $Zo \tan Bl$ can be determined as before, taking the new measurement $l$. Hence $\Delta X$ can be determined.

In Fig. 5

$$\frac{\left(\frac{V2}{V1}\right)}{\left(\frac{V2}{V1}\right)_r} = \frac{\sqrt{Rx^2 + \Delta X^2}}{Rx}$$

The ratio $$\frac{\left(\frac{V2}{V1}\right)}{\left(\frac{V2}{V1}\right)_r}$$

which I will designate $E$ can be determined from the voltmeter readings $$E = \frac{\sqrt{Rx^2 + \Delta X^2}}{Rx}$$

and thus $$Rx = \frac{\Delta X}{\sqrt{E^2 - 1}}$$

In practice the lines 11 and 12 are made concentric in accordance with good high frequency practice and are largely placed one inside of the other to reduce the overall dimensions to a minimum as represented in Figs. 2 and 3. Also, the intermediate concentric conductor 15 serves as one conductor of both lines 11 and 12 of Fig. 1.

In Figs. 2 and 3 I have three concentric conductors, an inner conductor 14, an intermediate tubular conductor 15 and an outer tubular conductor 16. Conductors 15 and 16 serve as the line 11 of Fig. 1 with the oscillator source of supply 10 adjustably inductively coupled thereto through the loop conductor parts 17 and 18. The connections 17 and 18 form the source end of line 11. Conductors 14 and 15 form the line 12 of Fig. 2 with the short circuiting device 13 adjustable by an adjusting device 19. A scale 20 is provided, calibrated in millimeters to read off the length $l$ of line 12. The unknown impedance $Zx$ is connected between conductors 16 and 14 at the lower open end of the concentric cable assembly. This point forms the remote end of one line and the beginning of the adjustable line. Voltmeter V2 is connected across conductors 15 and 16 also at the lower open end of the concentric line assembly. Between conductors 15 and 16 an adjustable concentric brush assembly comprising a brush 21 bearing on the inner surface of cable 16 and a brush 22 bearing on the outer surface of cable 15 comprise the connections for voltmeter V1. A suitable adjusting device 23 provides means for adjusting this brush assembly along the cables to make the distance thereof from voltmeter connection V2 one-quarter wave length. It is desirable to provide a scale 25 to indicate the position of the V1 connection.

The precautions usual with high frequency measuring circuits are necessary. The high frequency circuit connections are made as short as possible and are shielded. A resistance 26 is shunted across voltmeter connection V1 to terminate or match the line at this point. Vacuum tube rectifier voltmeters are used, small shielded tubes being used with short high frequency connections to the line conductors. At V1 in Fig. 2 such a shielded tube is indicated while at V2 the main tube connections are indicated. Direct current proportional to the voltages measured is conducted over wires 27 and 28 and the shields thereof to sensitive direct current instruments 29 and 30 arranged with their indicators close together so as to obtain good comparison readings. The outer concentric conductor 16 has an elongated slot 31 therein to bring out the D. C. connections from vacuum tube voltmeter V1.

By the arrangement described it is possible to confine the dimensions of the line apparatus to practicable limits. For example, using 300 megacycle measurement frequency corresponding to a wave length of one meter, the length of conductor section 16 may be 32 inches and the overall length of conductors 14 and 15 may be 65 inches. For these dimensions the inner conductor 14 may be ⅜ inch in diameter; conductor 15 may have an inner diameter of ¾ inch and an outer diameter of one inch. Conductor 16 may have an inner diameter of 1½' inches and an outer diameter of 2 inches. For such dimensions the surge impedance of line 11 is 24.3 ohms and that of line 12 is 41.6 ohms at 300 megacycles.

The use of the apparatus will now be reviewed, using actual test data. First, the 300 megacycle energy constant voltage is applied. The V1 brushes are then adjusted until the voltmeter reading ratio $$\frac{V2}{V1}$$

is a maximum, which occurs when V1 is one-quarter wave length from V2. The unknown impedance $Zx$ is now connected in line 12. Slider 13 is now adjusted until the voltage ratio $$\frac{V2}{V1}$$

is a minimum. This is or should be a condition of resonance. However, where, as for the $Zx$ here assumed, the resonance condition is not sharp but is rather broad it will be difficult to adjust this setting with high accuracy unless a resonance curve of line 12 is plotted. Hence, a series of additional voltmeter ratio readings are taken with larger and smaller values of $l$ than the one which appears to give the minimum ratio $$\frac{V2}{V1}$$

These additional readings are well off the resonance condition and a resonance curve is plotted as shown in Fig. 6.

Actual readings and calculations made were as follows:

| Point on chart Fig. 6 | $\frac{V2}{V1}$ | Reading of scale 20 | Values of $-X$ | $\sqrt{E^2-1}$ | $\Delta X$ | $Rx$ |
|---|---|---|---|---|---|---|
|  |  | M. m. |  |  |  |  |
| 1 | [1] 5.26 | 738.5 | −20 |  | 0 |  |
| 2 | 6.18 | 624.7 | −92 | 6.15 | 74.5 | 121 |
| 3 | 7.16 | 606.2 | −130 | .92 | 112.5 | 122.3 |
| 4 | 6.74 | 987.8 | +80 | .8 | 97.5 | 122 |
| 5 | 7.94 | 1,011.4 | +120 | 1.13 | 137.5 | 121.8 |

[1] Approximate resonance.

5.26 is the ratio of voltages $$\frac{V2}{V1}$$

with the slider 13 adjusted to the point where $$\frac{V2}{V1}$$

appears to be a minimum. At position 1 scale 20 is read and $l$ found to be 738.5 m.m. $Xx$ is now calculated from the formula $-Xx=Zo \tan Blr$. Actually $-Xx$ is taken from a table which is calculated on the basis of the physical dimensions of line 12 and for the length of line 738.5 is found to be −20 ohms. If the determination of this value is correct $\Delta X=0$. The value −20 ohms is plotted on a chart the abscissa of which is $\pm Xx$ ohms and the abscissa is the ratio of $$\frac{V2}{V1}$$

see Fig. 6.

Next we adjust slider 13 until the reading on scale 20 is 624.7.

$$\frac{V2}{V1}$$

is found to be 6.18 and $-Xx$ is calculated to be −92. This is plotted on the chart, point 2. Similarly we determine $-Xx$ for the other values of $l$ given and plot the results at points 3, 4 and 5. When a sufficient number of such points are plotted we can draw in the resonance curve with a high degree of accuracy. We find from the correct curve that $-Xx$ is −17.5 ohms and that $Xx$ is therefore 17.5 ohms.

Corrected ratio of $$\left(\frac{V2}{V1}\right)_r$$

from the curve is 5.25. $\Delta X$ is obtainable directly from the curve, Fig. 6, for example $\Delta X$ for point 2=92−17.5=74.5; for point 4=80+17.5=97.5.

$$Rx = \frac{\Delta X}{\sqrt{E^2-1}}$$

is now obtainable and is found from an average of the four readings to be 122 ohms. Hence $Zx=(122+J\ 17.5)$ ohms.

What I claim as new and desire to secure by Letters Patent of the United States is:

1. In a method of determining the reactance component of an unknown impedance at an ultra high frequency, the steps which consist in impressing a constant high frequency voltage on a transmission line at one end, measuring the voltage along such line at points designated V2 and V1, ¼ wave length apart, one of which points V2 is at the remote end of such line, thereby obtaining a maximum $$\frac{V2}{V1}$$

voltage ratio, impressing the voltage at the remote end of such transmission line across the unknown impedance and a second transmission line in series, the second transmission line having known electrical characteristics and an adjustable length determined by a short circuit, adjusting the length of the second transmission line until the reactance component of the unknown impedance is balanced out, such adjustment being obtained when the $$\frac{V2}{V1}$$

voltage ratio becomes a minimum, and measuring the length of the second transmission line as thus adjusted for the purpose of determining such balanced out reactance from known characteristics of such second transmission line.

2. In a method for determining the reactance component and the resistance component of an unknown impedance at an ultra high frequency, the steps which consist in impressing a constant ultra high frequency voltage on a transmission line at one end, measuring the voltage along such transmission line at two points designated V2 and V1, ¼ wave length apart, one point V2 being at the remote end of such transmission line, thereby obtaining a maximum $$\frac{V2}{V1}$$

voltage ratio, impressing the voltage at the remote end of such transmission line across the unknown impedance and a second transmission line in series, the second transmission line having known electrical characteristics and an adjustable length determined by a short circuit, adjusting the length of the second transmission line until the reactance component of the unknown impedance is balanced out, such adjustment being obtained when the $$\frac{V2}{V1}$$

voltage ratio becomes a minimum designated $$\left(\frac{V2}{V1}\right)_r$$

then measuring such length for the purpose of determining the reactance component of the second transmission line from its known characteristics and its length as thus adjusted, then changing the length of the second transmission line to obtain a higher voltage ratio designated $$\frac{V2}{V1}$$

measuring the new length for the purpose of determining the reactance component of the second transmission line for this new adjustment in order to solve for the resistance component of the unknown impedance according to the formula $$Rx = \frac{\Delta X}{\sqrt{E^2 - 1}}$$

where $\Delta X$ represents the difference between the reactance components of the second transmission line for its two mentioned adjustments and $$E = \frac{\left(\frac{V2}{V1}\right)}{\left(\frac{V2}{V1}\right)_r}$$

3. Apparatus for use in determining the reactance and resistance components of unknown impedances at ultra high frequencies comprising a transmission line, a constant voltage ultra high frequency source for supplying such transmission line at one end, means for simultaneously measuring the voltages at the remote end and ¼ wave length distance from the remote end of said transmission line, a second transmission line having known electrical characteristics, means for connecting the unknown impedance and the second transmission line in series across the remote end of the first mentioned transmission line, a short circuit determining the length of said second transmission line the position of which is adjustable to vary the length of the second transmission line, and means for measuring the length of the second transmission line.

4. In an ultra high frequency impedance measuring system, a rod and two tubes concentrically arranged, the tubes comprising a first transmission line and the inner tube and rod comprising a second transmission line, an ultra high frequency source of voltage arranged to supply the first transmission line at one end, means for measuring the voltages at the remote end of the first transmission line and at a point ¼ wave length from the remote end, means for connecting the second transmission line in series with an unknown impedance across the remote end of the first transmission line, and means for varying the length of the second transmission line comprising a conductor connected between said rod and inner tube and adjustable along the same.

5. Apparatus for determining impedance values at ultra high frequencies including a pair of transmission lines comprising a concentric cable structure having an inner rod, an intermediate tube and an outer tube, the outer tube being slotted to facilitate voltage measurements between it and the intermediate tube, the tubes comprising a first transmission line and the rod and intermediate tube comprising a second transmission line, means for impressing an ultra high frequency voltage on one end of the first transmission line, rectifier type vacuum tube voltmeters for simultaneously measuring the voltage of the first transmission line at the remote end thereof and at a point ¼ wave length from the remote end, provisions for connecting an impedance to be measured and the second transmission line in series across the remote end of the first transmission line, and means comprising a conductor slider bridged between the rod and intermediate tube for adjusting the length of the second transmission line.

MARVEL W. SCHELDORF.